United States Patent [19]

Spehner

[11] Patent Number: 5,232,779
[45] Date of Patent: Aug. 3, 1993

[54] REINFORCEMENT FIBERS AND/OR PROCESS FIBERS BASED ON PLANT FIBERS, METHOD FOR THEIR PRODUCTION, AND THEIR USE

[75] Inventor: Jean L. Spehner, Strasbourg, France

[73] Assignee: Ecco Gleittechnik GmbH, Fed. Rep. of Germany

[21] Appl. No.: 634,166

[22] PCT Filed: Apr. 17, 1990

[86] PCT No.: PCT/EP90/00614
§ 371 Date: Dec. 14, 1990
§ 102(e) Date: Dec. 14, 1990

[87] PCT Pub. No.: WO90/12906
PCT Pub. Date: Nov. 1, 1990

[30] Foreign Application Priority Data

Apr. 17, 1989 [DE] Fed. Rep. of Germany ....... 3912615
Mar. 26, 1990 [DE] Fed. Rep. of Germany ....... 4009662

[51] Int. Cl.$^5$ .................. D02G 3/00; B32B 13/02; D21C 3/00
[52] U.S. Cl. .................. 428/379; 428/381; 428/383; 428/389; 428/390; 428/393; 428/402; 162/70; 162/71; 162/72; 162/79; 162/158

[58] Field of Search .................. 162/1–10, 162/70, 71, 72, 79, 158; 428/396, 379, 381, 384, 383, 389, 390, 393, 402

[56] References Cited

U.S. PATENT DOCUMENTS 4,647,505  3/1987  Blackie et al. .................. 428/396

Primary Examiner—Patrick J. Ryan
Assistant Examiner—Richard P. Weisberger
Attorney, Agent, or Firm—Steinberg & Raskin

[57] ABSTRACT

The invention relates to reinforcing and/or process fibers based on plant fibers, obtainable thereby that plant fibers from which the wood components have been removed are treated with an aqueous solution of at least one metal compound selected among metal oxides, hydroxides, carbonates, sulfates, thiosulfates, sulfites, silicates or phosphates, subsequently washed and treated with an inorganic or organic binding agent or the fibers which have not been washed are neutralized with a mineral acid or that plant fibers from which the wood components have been removed are treated with an oxidation agent or that non-pretreated plant fibers are treated at 250° to 350° C. with the controlled addition of air so that carbonization of the fibers takes place.

24 Claims, No Drawings

REINFORCEMENT FIBERS AND/OR PROCESS FIBERS BASED ON PLANT FIBERS, METHOD FOR THEIR PRODUCTION, AND THEIR USE

The invention relates to reinforcement fibers and/or process fibers based on plant fibers, method for their production, and their use.

It is known that asbestos fibers are frequently mixed to molded parts. It was found recently that asbestos is by no means harmless from the point of view of health. In spite of this disadvantage, these fibers continue to be used to a large extent because in many fields of application they have great advantages and genuine alternatives are not on the market at this time.

The same applies for glass fibers. Artificial fibers also are not harmless since at increased temperatures breakdown reactions can take place with the formation of toxic vapors.

Attempts have also been made to find a substitute material for asbestos based on plant fibers. DE-OS 30 08 204 describes a method for the production of reinforcing fibers in which, with respect to the capillaries, the plant fibers are initially opened and subsequently the plant fibers treated in this way are impregnated with a slurry of lime and water and, after an intermediate drying process, with a solution of sodium silicate containing formaldehyde. These treatment steps can also be carried out in reverse sequence, this method, however, has also not led to the desired success.

The invention is therefore based on the task of making available reinforcing and process fibers which have the advantageous properties of the asbestos fibers without having their deleterious health disadvantages.

The task is solved by reinforcing and process fibers based on plant fibers obtainable through the following method.

The method for the production of the reinforcing and process fibers according to the invention is characterized in that:

a) the wood components and other undesired components of the plant are removed from the fiber-containing parts of the fiber plants, b) the plant fibers from which the wood components have been removed are treated, if desired, with an aqueous solution of at least one metal compound, selected from metal oxides, metal hydroxides, metal carbonates, metal sulfates, metal thiosulfates, metal sulfites, metal silicates or metal phosphates, that they are subsequently washed and treated with an inorganic or organic binding agent or that the non-washed fibers are neutralized with a mineral acid, or c) the plant fibers freed of wood components are treated, if desired with an oxidizing agent, or d) the raw, non-pretreated plant fibers are treated at 250° to 350° C. with controlled addition of air so that carbonization of the fibers takes place.

For the production of the reinforcement and process fibers, fibers of all fiber plants are suitable. Preferably bast fibers are used such as the stem fibers of flax, hemp, jute, nettle plants, the leaf fibers of the agave, the seed hair of, for example, cotton, and coconut shell fibers. Also, fibers obtainable from grasses, in particular from elephant grass which has a fiber component of approximately 50%, are usable.

The plant fibers in cut or uncut form must first be freed of wood components and other undesired plant components. This takes place by known and conventional methods, for example through roasting and decortication of green flax.

According to a preferred embodiment, the removal of the wood components takes place by breaking down the plant fibers with ultrasonic treatment in an aqueous medium. The length of the ultrasonic wave is not critical. It is chosen, depending on the apparatus, preferably so that optimum sound intensity is achieved and ultrasonic cavitation occurs.

A mixture of water with at least one polar organic solvent is preferably used as the aqueous medium. As organic solvent there is preferably used a $C_1$- to $C_4$- mono- or dialcohol, a $C_1$- to $C_4$-ketone, an ether miscible with water, or a mixture thereof. Especially preferred are methanol, ethanol, and acetone. The volume ratio of water to organic solvent lies preferably in the range from 5:1 to 1:5, particularly 3:1 to 1:3.

The ultrasonic method is a particularly fast simple and gentle method for removing the wood components and other undesired components of the raw plant fibers. The plant fibers obtained in this manner are not damaged mechanically and they possess the tear resistance of the original fiber. Since the other undesired plant components, in particular the binding agent, are also largely removed through the ultrasonic treatment, the fibers are highly compatible with other materials so that the can readily be taken up into a matrix. The plant fibers obtained after ultrasonic treatment are therefore suitable for the subsequently stated application fields even without further aftertreatment.

If desired the fibers from which the wood components have been removed can subsequently be treated with the aqueous solution of a metal compound. This solution contains, in particular, 1 to 30% by weight, especially preferred are 10 to 30% by weight, of the metal compound relative to the total weight of the solution. The treatment preferably takes place at 50° to 100° C.

If necessary, the fibers are subsequently washed with and possibly dried and treated with the binding agent or they are neutralized with a mineral acid, in particular hydrochloric acid, phosphoric acid or sulfuric acid, possibly dried and treated with the binding agent.

Preferred metal compounds are alkali or alkaline earth oxides, hydroxides, carbonates, thiosulfates or sulfates as well as basic iron, titanium, antimony or aluminum salts. Particularly preferred are alkali or alkaline earth hydroxides, alkali metasilicates, and alkali thiosulfates, for example, sodium or potassium hydroxide, sodium metasilicate and sodium thiosulfate.

As binding agents are used in particular cement, gypsum, silicates, alkali or alkaline earth salts of mineral acids, bitumen, asphalt, natural and synthetic elastomers, polyurethanes, phenolic resins, resols, melanine resins, epoxy resins or their mixtures.

Use of these binding agents can take place in aqueous or organic medium (solvent). The quantity of binding agent is preferably 5 to 20% by weight relative to the fiber fraction.

The fibers are impregnated with an aqueous or organic solution or suspension of the binding agent by, for example, immersing them in the solution or suspension, or they are sprayed with it. The impregnation preferably takes place at room temperature. Subsequently drying takes place.

Instead of the fibers obtained in the above described manner, it is also possible to treat the fiber components resulting from the working of the flax directly with the binding agent.

Depending on the application purpose of the fibers, additional treatment stages can also be provided according to the invention. If, for example, a light fiber is desired, a bleaching process can be included after the pretreatment of the fibers. For this purpose the fibers are treated in the customary manner at room temperature or at increased temperature with a peroxide or hypochlorite solution or with chlorine water and subsequently rinsed with water.

If a tribologic effect is desired, a solid lubricant can be added. Suitable solid lubricants are for example molybdenum disulfide, graphite, zinc sulfite, tricalcium phosphate, titanium oxide and the like.

If an additional flame-retardant finish is desired, a flame-retardant compound such as an antimony oxide, iron sulfate, alum, bismuth oxide, urea phosphate or chloroparaffin can be added thereto.

As a means of preservation a bactericide, such as a heavy metal salt or a choropherol compound, can be added thereto.

The fibers according to the invention, in particular the fibers obtained after the ultrasonic treatment, can also be made water repellent for example with a fluorocopolymer, paraffin, polysilane, reactive waterproofing agents (silanes, isocyanates) or zirconium or zinc salts.

As already mentioned above, in a further variant of the method according to the invention, plant fibers which still contain the organic components (wood components, sugar substances, pectins) can be pyrolized. Therein they are subjected to a treatment at a temperature of 250° to 350° C. with the controlled addition of air. Therein the plants do not burn but rather they are carbonized. For example the fibers are heated while being vigorously mixed in a tube furnace heated from the outside. The developing gases are drawn off and access of air is regulated so that no burning and a pressure reduction from approximately 0.1 to 0.05 bars takes place. Alternatively, inert gases such as carbon dioxide, nitrogen, nitrogen/hydrogen etc. can be introduced in order to lower the oxygen content. It is also possible to work in an essentially pure inert gas atmosphere.

The heating time is chosen so that the degree of carbonization is approximately 20 to 80%, in particular 20 to 60%. Surprisingly in this way a fiber is obtained without pretreatment which in particular fields of application can replace fibers harmful to the environment.

The fiber obtained through pyrolysis is relatively brittle and can very easily be crushed so that the fiber is present as microfiber. This can be shown in conjunction with the specific surface (according top Blaine-Dyckerhoff) and the density.

|  | Specific Surface (cm$^2$/g) | Density g/cm$^3$ |
| --- | --- | --- |
| Fibers pyrolized according to the invention (obtained from flax) | 6100 | 1.58 |
| Asbestos | 9900 | 2.5 |
| Flax fiber (untreated, cut) | 2000 | 1.46 |

If desired the fibers obtained through pyrolysis can still be impregnated by immersing the same in a solution of a resin, synthetic or natural rubber or elastomer, or spraying them with the solution. This impregnation serves the purpose of facilitating the wetting and processing of the fiber.

According to the further embodiment of the method according to the invention, the plant fibers are subjected to a chemical oxidation. For this purpose, the plant fibers from which the wood components had been removed and which had been usefully cut to a length of approximately 3 to 10 mm are treated with an aqueous solution of an oxidation agent. As oxidation agent are suitable in particular, alkali metal periodates, alkali metal persulfates, preferably alkali metal permanganates, and in particular potassium permanganate.

The fibers are wetted with the oxidation solution, for example by spraying, impregnation and the like. Treatment takes place at a temperature of approximately 60° C. up to the boiling point of the solution, preferably at approximately 80° to 95° C., and in particular at 85° to 95° C.

After the oxidation, which in general is completed after a few minutes, the fibers are washed and dried. Drying takes place at temperatures up to a maximum of 140° C.

The oxidized fibers have low inflammability and possess advantageous tribological properties.

Yarns can also be oxidized. Therein the oxidation process must be controlled so that the yarn is not destroyed. This takes place via the concentration of the oxidation solution and the contact time with the oxidation solution as well as through a subsequent reduction of the treated fibers with a conventional reducing agent, for example sodium sulfite.

In the following, application fields for the fibers according to the invention will be illustrated;

In the cement fiber industry the "mineralized" fibers according to the invention are useful for the production of, for example, cement plates and molded cement parts. For this purpose the fibers are treated as discussed above, cut to a length of for example 4 to 8 mm, and treated with a metal compound as described above. The working of the fibers into the cement takes place in conventional manner, for example by adding and mixing them into the cement or into the prepared concrete mixture.

In analogous manner gypsum plates and molded gypsum parts can be produced. The use of the mineralized plant fibers in this case is not absolutely necessary because the mineralization can take place during the use of the plant fibers in the gypsum paste. The length of the fibers depends on the desired mechanical strength of the gypsum parts.

For the production of gypsum for medical purposes the fibers are additionally bleached as described above, which simultaneously effects a disinfection.

For the production of roughcast and filler based on gypsum and glue, or water soluble resins, the pretreated fibers are used together with a conventional means of preservation. In this case also the desired strength is of decisive importance for the length of the fibers being used.

The fibers according to the invention are also suitable for use in the production of sound proofing materials, such as machine sheathing and substances for the underseal of motor vehicles and for use in sealers, roof panels, and street coating. For this purpose they are premixed, for example with bitumen/rubber dust, asphalt, and epoxy resins. The length of the fiber depends on the method of application. For coatings to be sprayed on, the length of the fibers should not exceed 10 mm, whereas the length of the fibers for coatings to be applied by a spatula can be 20 to 50 mm.

The fibers according to the invention are particularly suitable as additions to phenoplasts or thermoplastic synthetic materials, in particular in the production of molded parts of synthetic material.

The pyrolized and the oxidized fibers are particularly advantageous for insulating materials and friction linings comprising an agglomerate of several components and are pressed under pressure and increased temperatures. The fibers according to the invention therein serve for ensuring an optimum distribution and homogenous mixture of the numerous individual components which have very different densities. The pyrolized and oxidized fibers can also be used for improving the flowability of cement, synthetic materials, etc. Due to their tribolic properties, they can also be used for the production of technical papers.

The fibers according to the invention (including the oxidized fibers) can also be used in the form of threads or tissues in phenoplasts or thermoplastic synthetic materials which are processed to form slide and wearing parts and pressed machine parts such as brake bands, clutches and friction lining. They lend to the molded parts excellent mechanical properties such as tensile strength, tear resistance and flexural strength.

In the paper and cardboard industry, bleached or unbleached fibers according to the invention are used. For this purpose they are preferably impregnated with a resin solution (sizing) comprising resin, soaps, sodium silicate, and casein. In the same way, the fibers according to the invention can also be used in the production of felt.

The fibers according to the invention can also be used for the production of polishing agents. For this purpose fibers of approximately 2 to 4 mm length are soaked in wax or a rubber solution and subsequently are formed into beads via an extruder. As waxes there can be used for example beeswax, synthetic hard waxes, plant waxes such as carnauba wax, candelilla wax and the like. Depending on the type of wax, the ratio of wax to fiber is in the range of 3 to 5 g of wax per 1 g fiber. Through appropriate choice of wax the hardness and the thermal stability of the beads can be influenced.

The rubber solution of natural or synthetic rubber, dissolved in a solvent, for example methylene chloride and hydrocarbons such as xylene and toluene, as well as latex, are usable. Latex can also be applied in an aqueous medium.

The fiber beads impregnated with wax or rubber are used in particular as drum material for cleaning and polishing different materials (leather, wood, metal). They can also be used as blasting material in jet cleaning processes (for example sand blastings). The fiber beads impregnated with rubber can advantageously also be worked into molding compounds. They do not produce dust and are better anchored in the matrix in the presence of resins or in the reinforcement of elastomers.

EXAMPLES

Example 1

Green flax fibers have wood components removed by roasting and decortication. 100 kg of the fibers from which the wood components have been removed were stirred in a 5% aqueous sodium hydroxide solution for 30 minutes at 60° C. The fibers were isolated and neutralized by being sprayed with 10% phosphoric acid. Subsequently the fibers are dried in a hot air stream, for example in a fluidized bed.

Example 2

The process described in Example 1 is repeated. However, after the treatment of the fibers with a solution of sodium hydroxide the fibers are isolated, washed with water, and subsequently sprayed with cement sludge.

Example 3

100 kg cut green flax fibers are heated at 280° to 300° C. in an oven while being vigorously stirred. The gases formed are drawn off and replaced by fresh air in such a way that no burning occurs. Heating is continued until the desired degree of carbonization, for the example 80%.

Example 4

800 g of flax fibers from which the wood components have been removed are impregnated with a solution of 300 g potassium per manganate in 3.5 l of water with a temperature of 90° to 93° C. After 3 to 4 minutes foam forms, at which point the oxidation process is completed. Subsequently the oxidation agent is drawn off and the flax fibers are washed several times with water. After the washing fibers are dried at approximately 110° to 120° C.

The oxidized fibers have a density of 3.5 g/cm$^3$ and a specific surface according to Brain Dyckerhoff of 8600 cm$^2$/g.

Distribution of length of the oxidized fibers:

| | |
|---|---|
| 80% | between 10 and 500 μm |
| 5% | between 1 and 2 mm |
| 12.5% | between 2 and 3 mm |
| 2.5% | >3 mm |

Distribution of thickness of the oxidized fibers:

| | |
|---|---|
| 20% | between 5 and 8 μm |
| 25% | between 10 and 26 μm |
| 17.5% | between 30 and 32 μm |
| 25% | >40 μm (between 50 and 500 μm) |

Example 5

Raw flax stems, only superficially decorticated, are cut to a length of 10 cm and immersed in a mixture of 50% water and 50% ethanol (v/v) and subjected at room temperature to ultrasonic treatment. The ultrasound generator was set to 700 kHz at a power of 50 Watt/cm$^2$ via a piezoelectric configuration. The breakdown was complete after 10 minutes and the bath temperature increased by 30° C. The fibers were subsequently isolated and dried in a hot air stream.

I claim:

1. Reinforcement fibers or process fibers based on plant fibers, comprising plant fibers from which the wood components have been removed, said fibers having been treated with an aqueous solution of at least one metal compound selected from a group consisting of metal oxides, hydroxides, carbonates, sulfates, thiosulfates, sulfites, silicates or phosphates and mixtures thereof, thereafter said fibers being washed and treated with an inorganic or organic binding agent; or said fibers after being treated with said at least one metal compound and which have not been washed, being neutralized with a mineral acid, such that a product is obtained in which said at least one metal compound is distributed between said fibers in an unreacted form; or said fibers from which the wood components have been removed are oxidized; or said non-pretreated plant fibers being carbonized by heating said fibers to a temperature from about 250° C. to about 350° C. with the controlled addition of air such that carbonization of said fibers takes place.

2. Fibers according to claim 1, wherein said plant fibers are selected from the group consisting of flax, jute, mettle, hemp, cotton or sisal fibers.

3. Fibers according to claim 1, wherein said metal compound is selected from the group consisting of alkali earth oxides, alkaline earth oxides, hydroxides, carbonates, thiosulfates, sulfates, basic iron, titanium salts, antimony salts, aluminum salts and mixtures thereof.

4. Fibers according to claim 3, wherein said metal compound is selected from the group consisting of sodium hydroxide, potassium hydroxide, sodium metasilicate, sodium thiosulfate and mixtures thereof.

5. Fibers according to claim 1, wherein said plant fibers are treated with a 1 to 30% by weight aqueous solution of said metal compound.

6. Fibers according to claim 1, wherein said plant fibers are treated with said aqueous solution of said metal compound at 50° to 100° C.

7. Fibers according to claim 1, wherein said binding agent is selected from the group consisting of cement, gypsum, silicates, bitumen, asphalt, natural or synthetic elastomers, polyurethanes, phenolic resins, resols, melanin resins, epoxy resins and mixtures thereof.

8. Fibers according to claim 1, wherein the relation of said binding agent relative to the fiber fraction is 5 to 20% by weight.

9. Fibers according to claim 1, wherein said plant fibers from which the wood components have been removed being bleached by treatment with peroxides, hypochlorite or chlorine water before treatment with said aqueous solution of said metal compound.

10. Fibers according to claim 1, wherein said oxidation agent is selected from the group comprising an alkali metal periodate, an alkali metal persulfate, an alkali metal permanganate and mixtures thereof.

11. Fibers according to claim 10, wherein said oxidation agent is potassium permanganate.

12. Fibers according to claim 10, wherein said oxidation is carried out at a temperature of 75° to 95° C.

13. Fibers according to claim 1, wherein said fibers being finished additionally with an agent for providing flame retardation, a solid lubricant or a preservative.

14. Fibers according to claim 1, wherein said plant fibers obtained through pyrolysis are impregnated with a resin, natural or synthetic rubber or an elastomer and mixtures thereof.

15. Application of the fibers of claim 1 for the production of molded parts.

16. Application of the fibers of claim 1 for the production of cement, synthetic material, and gypsum molded parts, sound insulating materials, friction linings as well as in sealers, roof panels, street coating, polishing means and as a filler.

17. Fibers according to claim 1, wherein said wood components have been removed by subjecting said plant fibers to ultrasonic treatment in an aqueous medium.

18. Fibers according to claim 1, wherein said plant fibers which have been neutralized with a mineral acid are subsequently treated with an inorganic or organic binding agent.

19. Fibers according to claim 18, wherein said binding agent is selected from the group comprising cement, gypsum, silicates, bitumen, asphalt, natural or synthetic elastomers, polyurethane, phenolic resins, resols, melanin resins, epoxy resins and mixtures thereof.

20. Fibers according to claim 15, wherein said binding agent is selected from the group comprising cement, gypsum, silicates, bitumen, asphalt, natural or synthetic elastomers, polyurethanes, phenolic resins, resols, melanin resins, epoxy resins and mixtures thereof.

21. Fibers according to claim 19, wherein said plant fibers are treated after the ultrasonic treatment with an inorganic or organic binding agent.

22. Fibers according to claim 19, wherein said plant fibers are bleached after ultrasonic treatment by treatment with peroxides, hypochlorite or chlorine water.

23. Fibers according to claim 19, wherein said plant fibers are finished additionally with an agent for providing flame retardation, a solid lubricant or a preservative.

24. Fibers according to claim 17, wherein said fibers are used for the production of molded parts, cement, synthetic material, and gypsum molded parts, sound insulating material, friction linings as well as in sealers, roof panels, street coating, polishing means and as a filler.

* * * * *

UNITED STATES PATENT AND TRADEMARK OFFICE
CERTIFICATE OF CORRECTION

PATENT NO. : 5,232,779
DATED : August 3, 1993
INVENTOR(S) : Jean L. Spehner

It is certified that error appears in the above—identified patent and that said Letters Patent is hereby corrected as shown below:

```
Column 7, lines 19-20, after "alkali", delete "earth";
Column 7, line 21, after "basic iron", insert --salts--.
```

Signed and Sealed this

Twelfth Day of April, 1994

BRUCE LEHMAN

*Attest:*

*Attesting Officer*

*Commissioner of Patents and Trademarks*